J. Fox. Sheet 1, 5 Sheets.

Cracker Mach.

No. 3,415. Reissued May 4, 1869.

Witnesses
Johnson Hill
Francis A. Woods

Inventor
Joseph Fox

THE NORRIS PETERS CO., WASHINGTON, D. C.

J. Fox. Sheet 2, 3 Sheets.

Cracker Mach.

No. 3,415. Reissued May 4, 1869.

Witnesses:

T. Ring Hill

Francis A. Brooks

Inventor

Joseph Fox

THE NORRIS PETERS CO., WASHINGTON, D. C.

J. Fox. Sheet 3, 5 Sheets.
Cracker Mach.
No. 3,415. Reissued May 4, 1869.
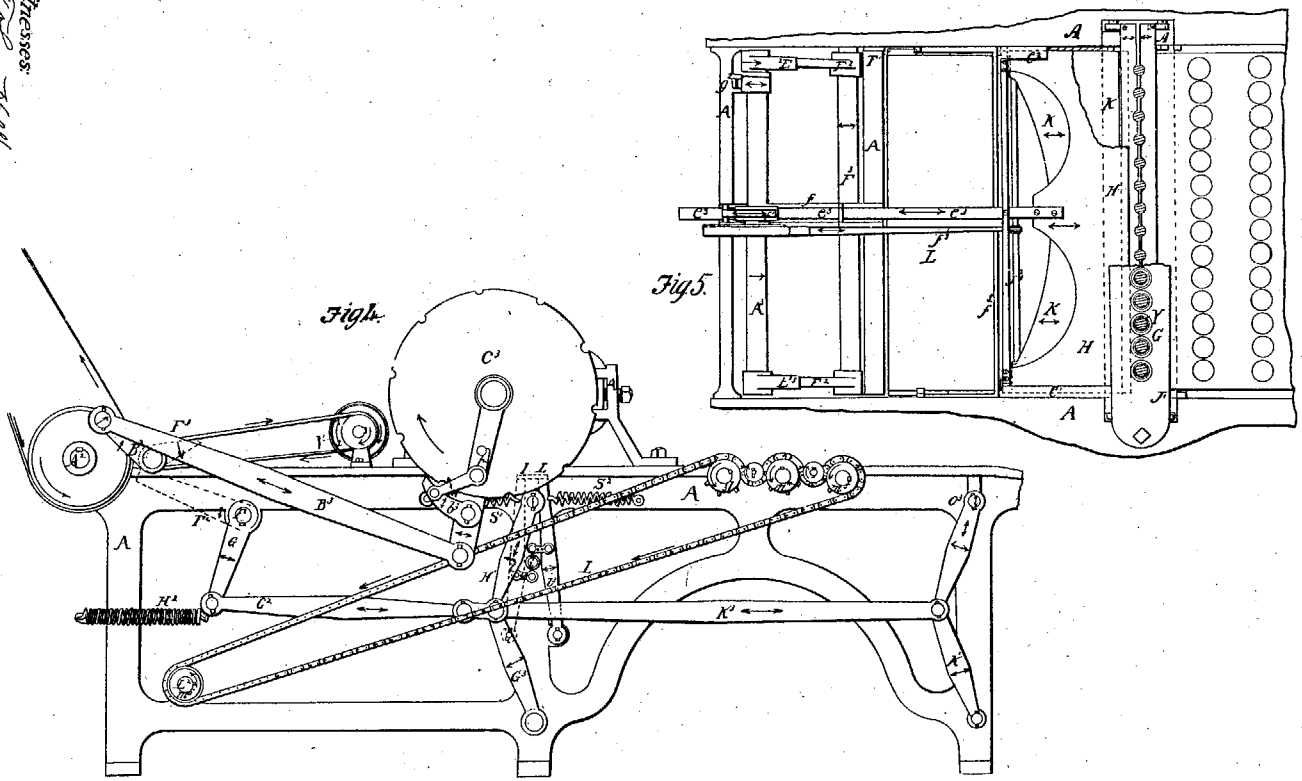
Witnesses:
Johnny Hall
Francis A. Woods
Inventor:
Joseph Fox
THE NORRIS PETERS CO., WASHINGTON, D. C.

J. Fox. Sheet 4, 5 Sheets.
Cracker Mach.
No. 3,415. Reissued May 4, 1869.
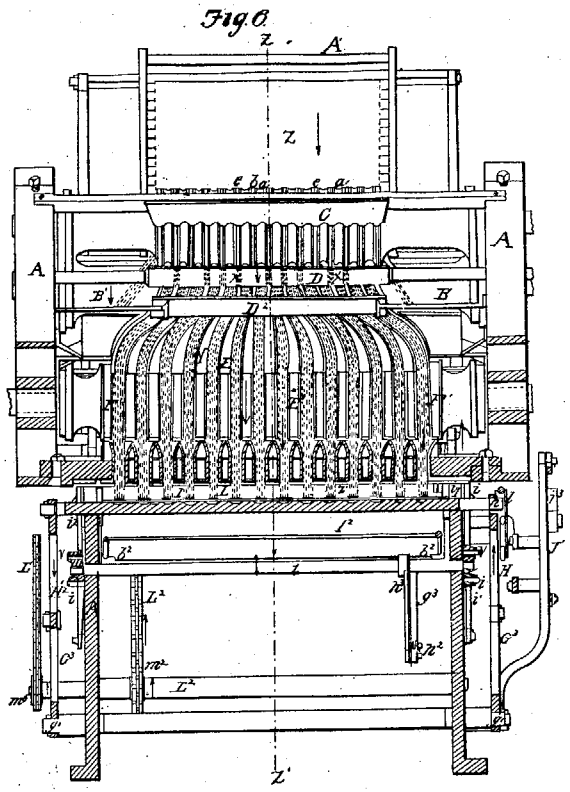
Witnesses
Johnny Hill
Francis A. Woods
Inventor
Joseph Fox
THE NORRIS PETERS CO., WASHINGTON, D. C.

J. Fox. Sheet 5, 5 Sheets.
Cracker Mach.
No. 3,415. Reissued May 4, 1869.
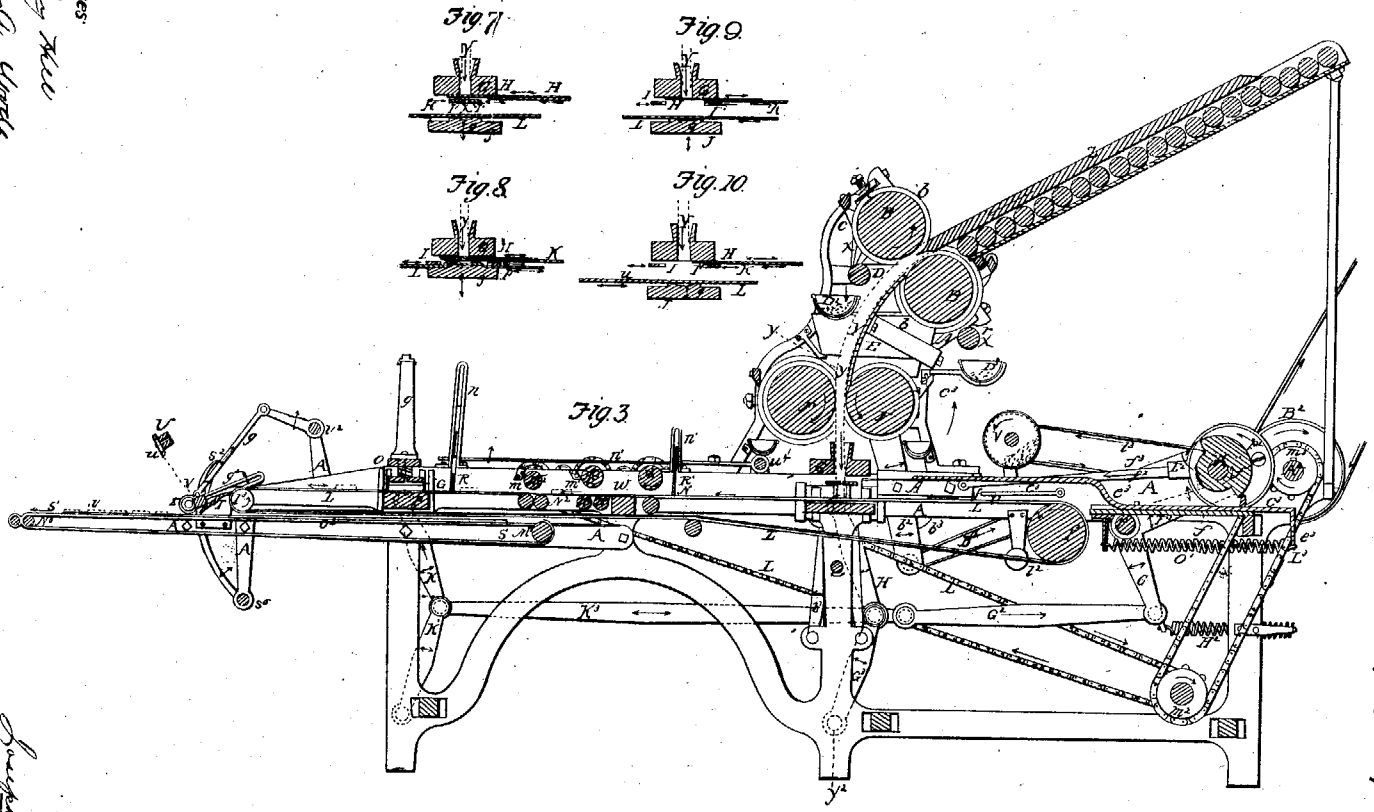
Witnesses:
Tohny Hill
Francis A. Lovely
Inventor
Joseph Fox
THE NORRIS PETERS CO., WASHINGTON, D. C.

UNITED STATES PATENT OFFICE.

JOSEPH FOX, OF LANSINGBURG, NEW YORK.

IMPROVED CRACKER-MACHINE.

Specification forming part of Letters Patent No. 22,793, dated February 1, 1859; Reissue No. 3,415, dated May 4, 1869.

*To all whom it may concern:*

Be it known that I, JOSEPH FOX, of Lansingburg, in the county of Rensselaer and State of New York, have invented a new and Improved Cracker-Machine; and I do hereby declare that the following is a full, clear, and exact description of my said invention, reference being had to the accompanying drawings, with the letters of reference marked thereon, in which—

Figure 1:
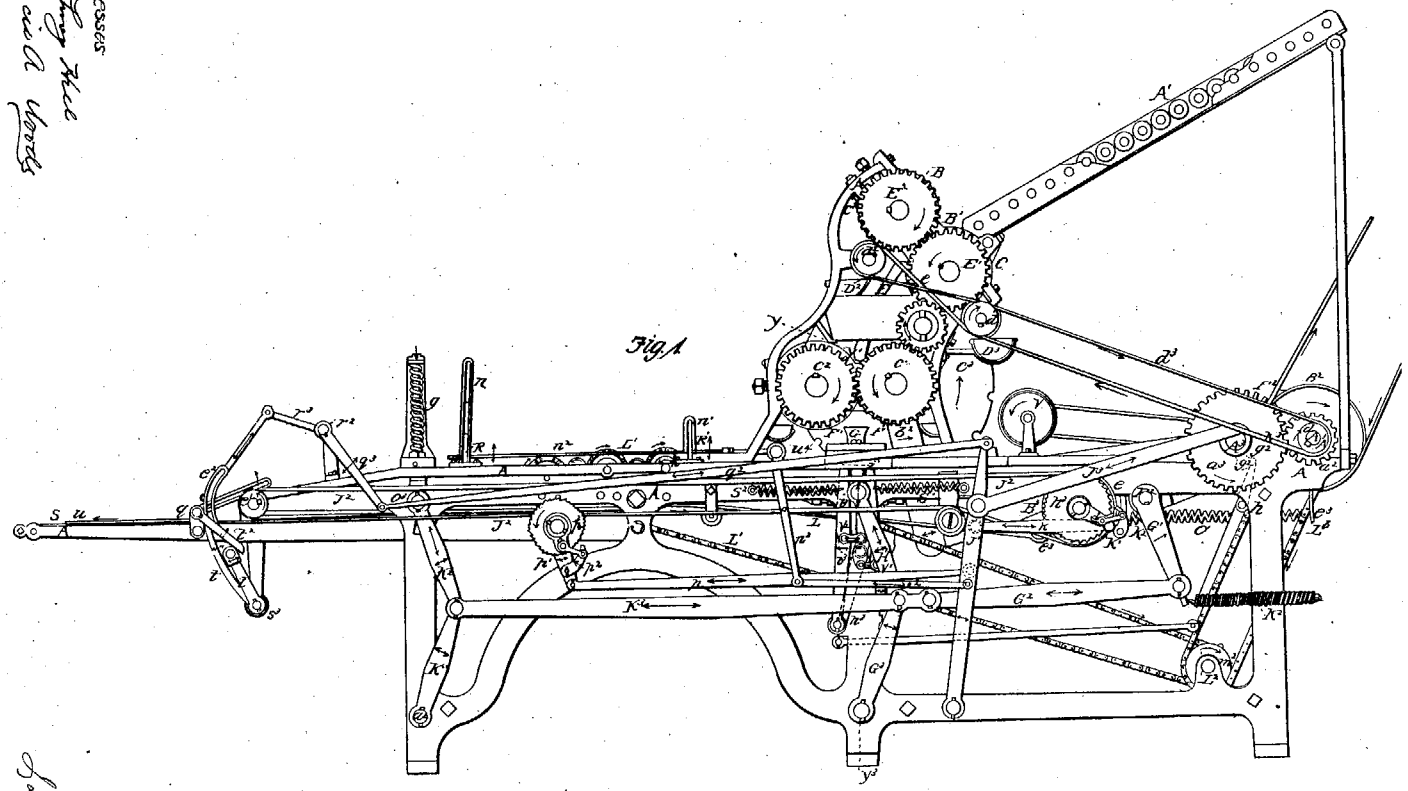
Figure 2:
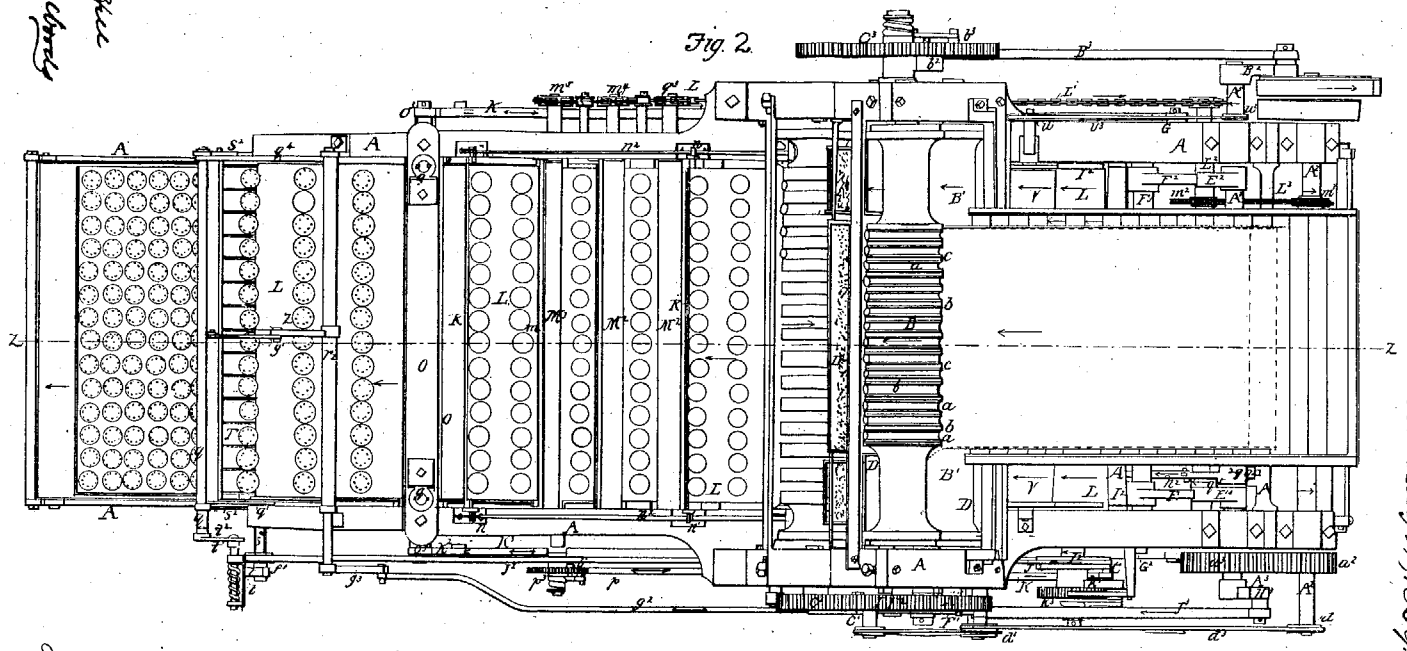

Figure 1 is an elevation of the left side of the machine. Fig. 2 is a plan of said machine. Fig. 3 is a longitudinal vertical section at and elevation of the parts back of the line Z and Z′ in Figs. 2 and 6, as seen from the left side of the machine. Fig. 4 is an inverted elevation of a part of the right side of the machine. Fig. 5 is a plan of some parts not fully shown in Fig. 2. Fig. 6 is a transverse section at and elevation of some parts back of the line $y\,y'\,y^2$ in Figs. 1 and 3, as seen from the front end of the machine. Figs. 7, 8, 9, and 10 are vertical longitudinal sections of some parts of said machine in various positions.

The same letters refer to like or corresponding parts, and the arrows on or by the parts indicate the direction in which the parts move.

In this specification the term "skin-covered sheets of dough" means a sheet of dough of which both sides have that compact impermeable surface which is formed by submitting a sheet of properly-prepared dough to the action of smooth rollers; and the phrase "skin-covered strip of dough" denotes a strip of dough of a cylindrical or other suitable shape, which is entirely surrounded by a similar surface.

In order to make a perfectly-shaped cracker, it is necessary that its surface before baking be covered by a continuous and unbroken skin, except where the upper surface is pricked, as hereinafter stated, to permit of the escape of the gases generated in baking.

The nature of my invention consists in forming continuous shallow depressions in the bearings of the grooved rollers that form skin-covered sheets of dough into skin-covered strips, for the purpose of preventing the formation of fin-like projections on said strips, as hereinafter described.

It also consists in dividing said skin-covered strips of dough into sections of a suitable shape and size to form crackers, which sections shall also be skin-covered except on the upper and lower surfaces or ends thereof, substantially in the manner and by the means hereinafter described and set forth.

It also consists in pressing the said sections endwise or in the direction of their axes, so that they may be expanded laterally, leaving the skin on the sides of said disks unbroken, in the manner and by the means substantially as hereinafter described and set forth.

It also consists in completing the skin on the tops and bottoms of the said disks or cracker by arranging them in rows and passing them between smooth rollers, in the manner substantially as hereinafter described and set forth.

It also consists in the employment of a docker or bar of prick-points for piercing the upper surface of the cracker, in connection with a movable plate for clearing the same actuated by springs, substantially as hereinafter described.

It also consists in the employment of an inclined plane and follower, for the purpose of placing the successive rows of crackers on the bake-pans, substantially as hereinafter described and set forth.

To enable others skilled in the art to which it relates to make and use my said invention, I will describe the construction and operation thereof, which are as follows:

A is a stationary frame for supporting the active parts of the machine.

A′ is a feed-bed composed of a succession of five rollers, which support the sheet of dough Z while it is being drawn into the machine.

B B′ are two rollers, grooved transversely to their axes, and turned in fixed bearings with equal, or nearly equal, surface-speed. The grooves *a* of one roller are opposite to the like grooves *a′* in the other roller, and have the spaces *b* between the grooves of one roller held firmly against the opposite space, *b′*, of the other roller.

In the spaces between the grooves of one or both of the rollers B B′, I construct continuous shallow channels or depressions C, for the purpose of cutting off the fin-like projections upon the strips of dough which result from passing them through the rollers, and which adhere to the strips where the rollers are plain. Thus having channels in the spaces between the grooves, better strips of dough can be made, and the rollers can be held together with less difficulty and turned with less power than if the spaces between the grooves were plain. The depression C should be about the one-fiftieth of an inch deep, and should occupy three-fifths of the space between the grooves.

C C′ are scrapers fixed to the frame A, for the purpose of clearing the bearings $b$ $b'$ and loosening the scraps of dough that form in the depressions C, and D D′ are plain rotating rollers, turned in fixed bearings, for receiving the loosened tape-like scraps of dough X from the scrapers C C′, and conveying them to the troughs $D^2$ $D^3$. The rollers F F′ are a second set of transversely-grooved rollers that may be employed to guide the strips of dough in their passage from the rollers B B′; but I find it is practicable to dispense with said rollers F F′ and to carry the strips of dough directly from the rollers B B′ through the guides or ways, hereinafter described, to the perforated bar G.

Below and a little in front of the feed-rollers B B′, I place the ways or guides E. These are shallow channels, of tin or other suitable material, one for each strip of dough, and perpendicular to the axes of said rollers B B′. These ways are so constructed as to spread apart the strips of dough as they come from the said feed-rollers and direct each strip to a passage between the rollers F F′, or, when these rollers are dispensed with, to an aperture in the perforated bar G, which is placed just below those rollers if employed, or, if not, just below the guides E, and consists of a bar running parallel to the axes of the rollers B B′, and perforated with numerous apertures, each of which is of sufficient size to admit of the passage of a strip of dough. The said feed-rollers B B′ are made to turn and carry forward the strips of dough with an intermittent or step-by-step motion in the following manner:

The prime motive power of the machine is applied to the shaft $A^2$, which, by means of the pinion $a^2$ and spur-wheel $a^3$, turns the shaft $A^3$. The shaft $A^3$ has a crank, $B^2$, Figs. 2 and 4, which works the pitman $B^3$, that vibrates the arm $b^2$, which is loose on the axle of the roller F′, and carries a pawl, $b^3$, that turns the ratchet-wheel $C^3$, fast on the axle of the roller F′, and the roller F′ turns the roller F by the spur-wheels $c'$ $c^2$, Fig. 1, and also turns the rollers B B′ by the pinion $c^3$ and spur-wheels E′ $E^2$, so that every time the shaft $A^3$ makes a revolution the sets of rollers B B′ and F F′ turn one step. When the second set of rollers F F′ are dispensed with, as above stated, the said ratchet-wheel $C^3$ is placed on the axle of the roller B′, which turns the roller B by means of the spur-wheels E′ $E^2$. In other respects the mechanism is the same.

Just below the perforated bar G, and parallel with it, is placed the thin knife or blade H. This knife slides in fixed ways $e'$ $e^2$, Figs. 3 and 5, and is worked by a rod, $e^3$, that slides in the guide $f$ past the shaft $A^5$. The cam $f'$ or the shaft $A^3$ strikes against the projection $f^2$ on the rod $e^3$, and thereby draws back the knife H just before the rollers B B′ begin a step, and retains it there until those rollers turn a step and until the clamp-bars I I, come together, when the said cam $f'$ leaves the said projection $f^2$ and the spring O′ drives the knife swiftly through the strips of dough. Under the said knife H, and parallel with the same, I place the clearer K, for the purpose of removing the pressed crackers which may adhere to the knife. This clearer is worked by the shaft $A^3$ by means of the eccentric P′, connected with the clearer by the rod $f^3$. Below the knife and clearer are the clamp bars I I′, which inclose or hold the short sections or pellets of dough at the moment when they are severed from strips by the action of the knife H, as aforesaid, and which separate and leave the sections so severed as soon as they are cut off by said knife.

Under the perforated bar G, and parallel therewith, is the press-plate J, which is so arranged that after the short sections of dough are cut from the strips and while they are held by the clamp-bars I I′, it will rise up and flatten the sections of dough against the knife H. The said press-bar is covered by the endless apron L, hereinafter mentioned, and, in order to prevent the crackers when pressed from adhering to the apron, I make the press-plate J with concavities $g$, Figs. 3 and 6, at the places where the crackers are pressed, so that the pressed pieces shall be a little convex on their under side, and will more readily free themselves from the apron as it straightens out of the depressions.

L is an endless apron passing over the press-plate J and between several sets of rollers, for the purpose of rolling the pressed cracker and completing the skin at the points where it has been severed from the skin-covered strips, as aforesaid.

M M′ $M^2$ are smooth plain rollers arranged across and over the apron L, and revolved in fixed bearings for the purpose of rolling the pressed crackers as they are carried under these rollers by the apron L. The free roller N and pair of friction-rollers N′ N′ $N^2$ $N^2$ are arranged under the apron for the purpose of giving a better shape to the cracker as it passes under the rollers M M′ $M^2$.

O is a fixed docker or bar of prick-points. P is a rising and descending plate under the docker and apron. L is a movable plate for freeing the crackers from the docker, perforated in such a manner that the prick-points pass through it, and so that it will move freely up and down said points.

At the ends of the clearer-plate Q are placed the springs $g$ $g$, by which, after the descent of the press-plate P, the plate Q is forced down, shedding the crackers from the prick-points in its descent. R R′ are rising and descending straight-edges for evening the rows of crackers before they are rolled and docked. They are so constructed that they are raised up wherever the apron L stops moving, and descend to the surface of the apron a moment after it starts again.

T is a fixed ribbed inclined plane at the point where the endless apron L passes over the last roller, $e'$, and upon which the crackers are carried by said apron after they have been properly rolled and docked.

U is a follower, so constructed that it moves down the inclined plane T, when the apron L stops, and when it again moves forward the said follower is carried back up the inclined plane, and is elevated sufficiently to allow a row of crackers to pass under it.

S is an endless apron moving in the same direction as the motion of the apron L, and upon which the bake-pans V are placed for the purpose of receiving the completed crackers as they are pushed down by the follower U.

The mechanism by which motion is communicated from the prime motor to the different parts of the machine is fully shown in the drawings; but I do not give a particular description thereof, because it would make this specification extremely voluminous, and because I do not wish to confine myself to any particular mechanism.

The several motions of the material parts of the machine herein subscribed may be produced in a variety of modes which will readily suggest themselves to any competent mechanic.

The operation of my said invention is as follows: A sheet of skin-covered dough is placed upon the the feed-bed A′, and one end thereof inserted between the grooved rollers B B′. By the action of these rollers the sheet of dough is divided into the skin-covered strips Y. The scrapers C C′ press against the rollers B B′ and loosen up the tape-like scraps of dough X from the depressions $c$, which fall upon the rollers D D′ and are thrown into the troughs $D^2$ $D^3$. From the said strip-producing roller B B′ the strips of dough pass into and through the guides E, which spread apart the said strips Y and guide them into the passages between the rollers F F′, or onto the passages through the perforated bar G, when neither the rollers F F′ nor any substitute therefor, but only the strip-producing-rollers B B′, are used to feed the strips of dough through the bar G. The rollers B B′ are turned by the means hereinbefore described with a step-by-step motion, and every time they turn a step they produce and feed down through the fixed bar G enough of each strip of dough to form a cracker. As soon as the rollers stop turning, the clamp-bar I I′ closes upon the said strips of dough a little way below the said bar G, as seen in Figs. 3 and 5. Then the thin broad blade or knife H is driven with a sudden blow through the strips of dough close under the bar G and stops there, over the upper ends of the several pieces X, as shown in Fig. 7. The bar I keeps the pieces of dough from being carried away by the knife as it severs them from the strips, and the two bars I I′ keep the pieces from falling on their sides until the press-plate J holds them against the knife H. Just after the knife cuts off the pieces or sections X the press-plate J rises, and when it begins to flatten the said pieces of dough endwise against the knife H, the bars I I′ fly open or away from the said pieces X, as shown in Fig. 8, so as to leave the pieces free to expand sidewise as the press-plate rises to the highest position. (Shown in Fig. 9.) Then the press-plate, with the apron L over it, begins to descend, and at the same time the thin sharp clearer K, which shaves the under side of the knife, moves forward and loses the flattened pieces of dough that stick to the knife, while they are nearly in line with those that adhere to the apron, and then moves back with the knife from under the ends of the strips of dough, as in Fig. 10, while the press-plates and apron finish their descent, and the apron with the row of crackers thereon advances a step. Then the strips of dough are again fed down through the bar G by another turn of the rollers B B′, and pieces are cut off, flattened endwise, and moved forward as just described. As the newly-pressed row of crackers moves forward with the apron from the press-plate J, the straight-edge R′ descends upon the apron in front of said row and straightens it as the crackers are carried against it by the movement of the apron. It is raised up as the apron stops, and remains elevated long enough to permit the row just straightened to pass under it as the apron starts again, and it descends again in time to meet the next succeeding row. After being straightened in this manner the row of crackers passes successively between the rollers M N and M′ N′ and $M^2$ and $N^2$ $N^2$. By means of these rollers the skin on the top and bottom of the crackers is completed and the circular shape of the crackers is preserved. As the row of crackers leaves the last set of rollers it is again evened by the straight-edge R, and then passes under the docker O. The step-by-step motion of the apron L is such that every time it stops it leaves a row of crackers under the said docker. Then the plate P raises the row against the points of the docker and descends before the apron starts again. As the plate P rises, it lifts the plate Q, so as to bare the points of the docker to the crackers, and as the plate P descends the plate Q follows down, or by means of the spring at $g$ $g$, and sheds the row of crackers from the docker, which crackers are then carried forward at the next step of the apron. After the row of crackers leaves the docker it is deposited by the apron on the inclined plane T. For each step of the apron L the apron S moves the bake-pan V forward either by a step-by-step or a constant motion the proper distance to receive a row of crackers, and every time the apron L′ leaves a row of crackers at the top of the fixed inclined plane T the follower U is brought down back of the row, and is then moved down the inclined plane, sliding the row of crackers in front of it onto the bake-pan. The follower then returns up the said inclined plane, and at the top is elevated and passes over the next row of crackers just deposited by the apron L, after which it descends back of the last named row and moves it onto the bake-pan. When filled, the brake-pan is removed to the oven and its place supplied by another.

What I claim as new, and desire to secure by Letters Patent, is—

1. The depressions in the spaces between the grooves in one or both of the rollers B and B′, that form the strips of dough from the sheet, substantially as and for the purposes hereinbefore specified.

2. The feed-bed of free rollers A′, in combination with the grooved rollers B B′, substantially as herein described and specified.

3. Moving the grooved rollers B B′, arranged with respect to each other, as herein specified, with a regular intermittent or step-by-step motion, substantially in the manner and for the purposes hereinbefore specified and set forth.

4. The ways or guides E, in combination with the grooved roller B B′, substantially as and for the purposes herein described and specified.

5. The perforated bar G, in combination with the ways or guides E, substantially as and for the purposes hereinbefore described and set forth.

6. The knife H, in combination with the perforated bar G, substantially as and for the purposes hereinbefore described and specified.

7. The rollers B B′, ways or guides E, perforated bar G, and knife H, all combined and operated substantially as hereinbefore specified.

8. Feeding the said strips of dough Y through the perforated bar G and opposite the knife H with a regular intermittent or step-by-step motion, in the manner and for the purposes hereinbefore specified.

9. Passing strips of dough Y through apertures in a plate or bar, G, and cutting off short sections of said strips by means of a sudden blow with a blade or knife, H, substantially in the manner and for the purposes hereinbefore described and specified.

10. The employment of the clamp-bars I I′, in combination with the knife H, as herein described, to cut off and hold the sections of the strips of dough as the strips are fed through the bar G, as specified.

11. Forming short sections of skin-covered strips of dough into disks or crackers by pressure applied to the ends of the sections by the devices, substantially as herein described.

12. The rollers, substantially as described, by which the crackers are rolled on the apron, and by which the skin on the upper surface of the pressed crackers is completed.

13. The straight-edges R and R′ for evening the rows of crackers before rolling and docking, as specified, in combination with the rollers and dockers, substantially as herein described and set forth.

14. The combination of the docker O with the movable clearer-plate Q, and springs *g g*, substantially as and for the purposes herein shown and specified.

15. The endless apron L, inclined plane T, follower U, and second endless apron, S, all combined and operated substantially in the manner and for the purposes herein described and specified.

In witness whereof I have hereunto set my hand this 19th day of April, 1869.

JOSEPH FOX.

Witnesses:

FRANCIS A. WOODS,

E. COWEN.